United States Patent [19]

Kim

[11] Patent Number: 5,122,891
[45] Date of Patent: Jun. 16, 1992

[54] COLOR LIQUID CRYSTAL DISPLAY DEVICE

[75] Inventor: Seong H. Kim, Daegu, Rep. of Korea

[73] Assignee: Goldstar Co., Ltd., Seoul, Rep. of Korea

[21] Appl. No.: 560,222

[22] Filed: Jul. 25, 1990

Related U.S. Application Data

[63] Continuation of Ser. No. 139,305, Dec. 29, 1987, abandoned.

[30] Foreign Application Priority Data

Dec. 29, 1986 [KR] Rep. of Korea ............... 11474/1986

[51] Int. Cl.⁵ .............................................. G02F 1/133
[52] U.S. Cl. ......................................... 359/67; 359/68
[58] Field of Search ................. 350/339 F; 359/67, 68

[56] References Cited

U.S. PATENT DOCUMENTS

| | | | |
|---|---|---|---|
| 3,787,110 | 1/1984 | Berreman et al. | 350/341 |
| 4,506,956 | 3/1985 | Dir | 350/339 F |
| 4,653,862 | 3/1987 | Morozumi | 350/339 F |
| 4,684,218 | 8/1987 | Aizawa et al. | 350/336 |

*Primary Examiner*—John S. Heyman
*Assistant Examiner*—Anita Pellman Gross

[57] ABSTRACT

A color liquid crystal display device includes a color filter having light transmitting holes formed in picture elements for increasing the light transmission through the color filter, thereby enabling the brightness of the screen to be improved. The color filter also includes a plurality of black strips each formed between adjacent R, G, and B picture elements or between adjacent unit color picture elements for improving the contrast of the screen.

15 Claims, 2 Drawing Sheets

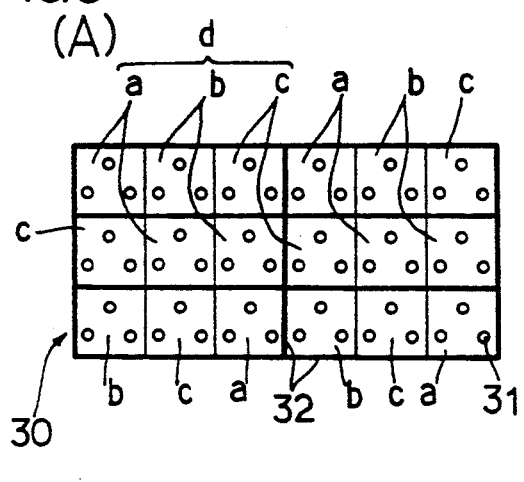
FIG. 3 (A)
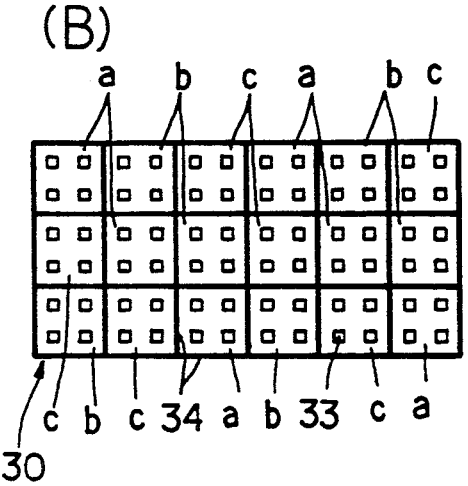
FIG. 3 (B)
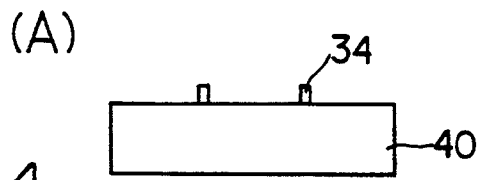
FIG. 4 (A)
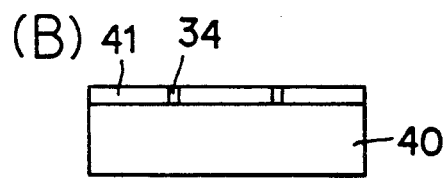
FIG. 4 (B)
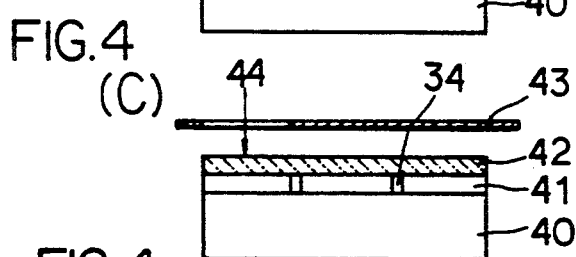
FIG. 4 (C)
FIG. 4 (D)
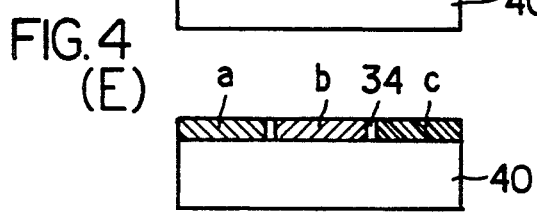
FIG. 4 (E)

COLOR LIQUID CRYSTAL DISPLAY DEVICE

This application is a continuation of application Ser. No. 07/139,305 filed on Dec. 29, 1987, which is now abandoned.

BACKGROUND OF THE INVENTION

1. Field of the Invention

The present invention relates to a color liquid crystal display device for displaying pictures and characters, more particularly to a color liquid crystal display device which increases the transmission of the natural light or the light radiated from a rear lamp, thereby enabling the brightness of the screen to be improved and the contrast thereof to be increased.

2. Description of the Prior Art

Referring to FIG. 1, there is shown a conventional color liquid crystal display which comprises upper and lower substrates 2 and 9 made of a glass or a plastic. The upper substrate 2 has a color filter 3 carrying R, G, B picture elements a, b, and c and an upper transparent electrode 4 formed on said color filter 3. The electrode 4 is formed by forming a coating of an indium tin oxide or a tin oxide on the overall surface of the color filter 3 by using sputtering or vacuum evaporation methods, and then partially removing the coating at the unnecessary parts by using a photo-etching method. On the transparent electrode 4, an insulation material such as Pi(Polymide iso indro Qinazoline), PiQ(Polymide iso indro Qinazoline Dione), or PVA(Polyvinyl Acetate) is coated to form an upper orientation film 5. And also the lower substrate 9 has a lower transparent electrode 8 and a lower orientation film 7 which are formed in similar manner to those of the upper substrate 2.

Upper and lower substrates 2 and 9 formed as above are joined at peripheral edges thereof by means of an adhesive such that a space with a certain width is formed therebetween. A liquid crystal 6 is filled and sealed in the space formed between upper the and lower substrates 2 and 9. Finally, upper and lower polarizing plates 1 and 10 are attached on the outwardly exposed surfaces of upper and lower substrates 2 and 9, respectively, to provide a completed liquid crystal display device.

In such a conventional construction of the color liquid crystal display device, R, G, and B picture elements a, b, and c correspond to picture elements formed by the overlapped transparent electrodes 4 and 8. A white light is radiated from a rear lamp 11 disposed at the back of the color filter 3. This light has the R, G, and B colors upon passing through the color filter 3. The quantity of light at each picture element is controlled by the change of the arrangement of the liquid crystal which is generated by the ON-OFF control of the voltage supply for the transparent electrodes 4 and 8. As the rear lamp 11 which is the white light source, an interior fluorescent lamp may be used. Of course, an exterior light such as a natural light may be used.

Referring to FIG. 2, there is shown the arrangements of picture elements in the color filter of the prior art color liquid crystal display device. FIGS. 2(A) to 2(D) show arrangements of picture elements of stripe, mosaic, triangular, and square types, respectively. Reference numerals a, b, and c designate R, G, B picture elements of the color filter, respectively. The shaded portion d designates a unit color picture element. The mosaic type shown in FIG. 2(B) is most widely used in color filters.

Although having different arrangements of R, G, B picture elements a, b, anc c, all conventional color filters are formed into a flat plate type in which adjacent picture elements are very closely adjoined with each other. Thereby, the quantity of light radiated from the rear lamp 11 is attenuated, so that the screen is darkened. If the brightness of the color filter is increased, a distinct picture quality on the screen can be provided. However, this results in a high consumption of electric power of the light source. Consequently, it is unsuitable to apply such technology to a compact device.

SUMMARY OF THE INVENTION

Therefore, an object of the present invention is to eliminate the above-mentioned disadvantages encountered in the prior art and to provide a color liquid crystal display device having a distinct picture quantity on the screen which can be accomplished by increasing the transmission of light through the color filter for improving the brightness of the screen and preventing a decrease in the contrast of the screen due to the improvement of the brightness.

In accordance with the present invention, this object is accomplished by providing a color liquid crystal display device wherein each picture element of the color filter is provided with light transmitting holes which pass part of the light radiated from the back of the picture element, and a black strip is formed between adjacent picture elements to prevent an excessive leakage of the light.

BRIEF DESCRIPTION OF THE DRAWINGS

The present invention will be more apparent from the following description of an embodiment of the present invention with reference to the accompanying drawings wherein:

FIG. 3(A) and 3(B) are plan view of color filters used in a color liquid crystal device in accordance with the present invention; and FIGS. 4(A) to 4(E) are the explanation of steps of the manufacture of the color filter in accordance with the present invention.

DETAILED DESCRIPTION OF THE PREFERRED EMBODIMENTS

Figure 1:
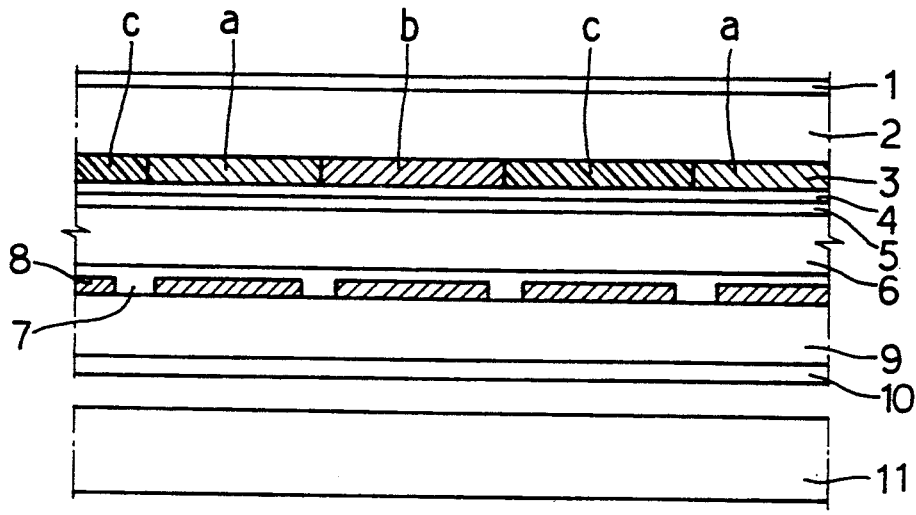
FIG. 1 is a sectional view of a conventional color liquid crystal display device.
Figure 2A:
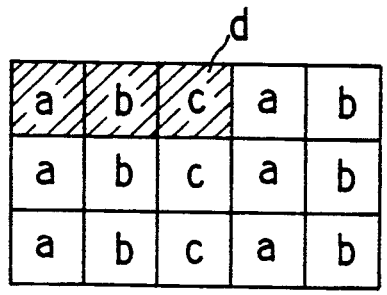
FIGS. 2(A) to 2(D) are plan views of conventional color filters used in a color liquid crystal disply device, which have different arrangements of picture elements, respectively.
Figure 2B:
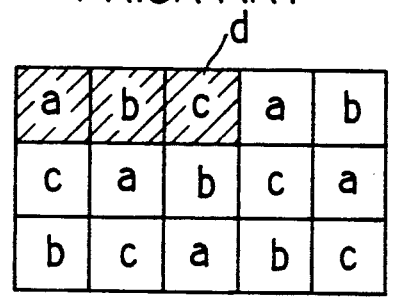
Figure 2C:
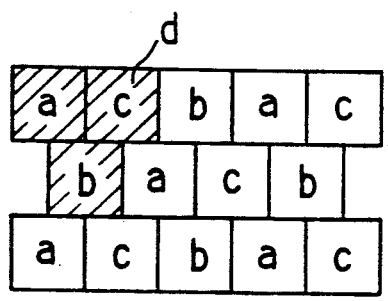
Figure 2D:
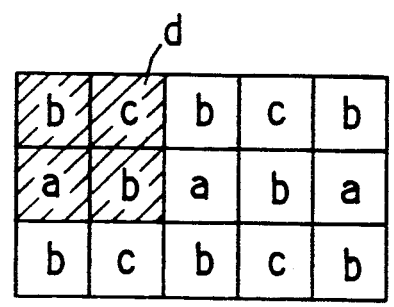

Referring to FIG. 3(A) and 3(B), there is shown a color filter 30 of the present invention wherein several light transmitting holes 31 and 33 having a diameter of 10-50 $\mu$m are formed at each R, G, B picture element, a black strip having a width of 1-50 $\mu$m is formed between adjacent R, G, B picture elements or between adjacent unit picture elements.

FIG. 3(A) shows the mosaic-type color filter 30 in which three circular light transmitting holes 31 are perforated through each of R, G, B picture elements a, b, and c. A black strip 32 is also formed between adjacent unit picture elements d each of which comprises three R, G, B picture elements. Each R, G, B picture elements has the size of $140 \times 160$ $\mu$m. The diameter of each light transmitting hole is 30 μm and the width of each strip is 10 μm.

In the mosaic-type color filter 30 shown in FIG. 3(B), four square or rectangular light transmitting holes 33 are formed at each of R, G, B picture elements a, b, and c. In this embodiment, a black strip 34 is formed between adjacent picture elements. The size of the light transmitting hole 33 is 20×30 μm, and the width of the black strip 34 is 5 μm.

In such a construction of the color filter according to the present invention, the light radiated from the rear lamp is partially passed through light transmitting holes 31 and 33, so that the quantity of light passing through the color filter is increased, thereby enabling the screen of the liquid crystal display device to be brightened. The black strips function to prevent excessive leakage of the light, and thus, to improve the contrast and the brightness of the screen. Also, the black strips prevent a decrease in the contrast of the screen due to an excessive brightness of the screen, so that a color liquid crystal display device with a distinct picture quality can be obtained.

Light transmitting holes 31 and 33 can be formed by using a laser device, an electric discharge device, or a photo-etching method. Black strips 32 and 34 are formed by using a photo-etching method or a printing method. As the material of the black strip, a graphite coating, a black pigment, or carbon black having a black color can be used.

The color filter 30 may be manufactured by using a screen or offset printing method, a dyeing-vacuum evaporation method, a photo-etching method by the formation of various colors on a polarizing film, or a high polymer electro-depostion method utilizing positive and negative ions.

Referring to FIG. 4, the manufacture of the color filter 30 according to the present invention will be now described, and is carried out, for example, by utilizing a photo-etching method which can provide superior light transmission and colors for the color filter and enables the formation of a precise pattern.

As shown in FIG. 4(A) black strips 34 are selectively formed on the glass substrate 40 by a photo-etching method utilizing photoresists. Then, a glue layer 41 such as gelatin or casein is coated on the glass substrate 40 by means of a spinner or a roller, as shown in FIG. 4(B). On the overall surface of the glue layer 41, a photoresist 42 is coated. As shown in FIG. 4(C), a light 44 is radiated on the area on which a red dye is to be attached by using a photomask 43. Thereafter, the light exposed part of the photoresist 42 is removed by a developing solution, so that the part of the glue layer 41 corresponding to the removed part of the photoresist 42 is exposed. Then, a red dye 45 is applied to the exposed part 41a of the glue layer 41, in order to form a red picture element a, as shown in FIG. 4(D). Thereafter, the steps of FIGS. 4(C) and 4(D) are repeated to form a green picture element b and a blue picture element c. Thus, the color filter as shown in FIG. 4(E) is obtained, which includes several black strips 34 and R, G, B picture elements a, b, and c.

Light transmitting holes can be formed by partially masking the areas at which the holes are described to be formed. Otherwise, the light transmitting holes can be formed by coating the glue layer on the glass substrate, except on the areas at which the holes are to be formed, or by laser machining the produced color filter as shown in FIG. 4(E).

In the color liquid crystal display device comprising a color filter according the present invention, when the light radiated from the rear lamp passes through transparent electrodes and both substrates provided with orientation films, the light transmission through the color filter is increased by virtue of the light transmitting holes, thereby enabling the brightness of the screen to be improved. And also, black strips formed between color picture elements provide for improved contrast on the screen. Thus, the present invention provides a color liquid crystal display device with a bright and distinct picture quality.

Furthermore, the light transmitting holes are invisible, due to the very small size of 10-50 μm. If it is desired to provide a screen having the same brightness as that of the prior art, the consumption of electric power by the rear lamp of the display device of the present invention can be effectively reduced.

What is claimed is:

1. A liquid crystal display device comprising:
   two substrates spaced apart to define a space for receiving a liquid crystal therebetween and adjoined together at peripheral edges thereof, each of said substrates having a transparent electrode and an orientation film disposed thereon;
   a color filter formed on at least one of said substrates and provided with R, G and B picture elements arranged in unit color elements;
   a plurality of light transmitting perforated holes formed in each picture element of said color filter for increasing brightness, said light transmitting holes having a diameter of 10-50 μm; and
   a plurality of black strips formed only at the boundaries between adjacent unit color elements for increasing contrast, the black strips enclosing an R picture element, a G picture element and a B picture element in each of the unit color elements.

2. The color liquid crystal display device of claim 1, wherein said light transmitting holes have a diameter of 30 μm.

3. The color liquid crystal display device of claim 1, wherein said black strips have a width of 10 μm.

4. The color liquid crystal display device of claim 1, wherein said black strips have a width of 5 μm.

5. The color liquid crystal display device of claim 1, wherein said picture elements are disposed in an arrangement selected from stripe, mosaic, triangular, and square arrangements.

6. The color liquid crystal display device of claim 1, wherein only three or four holes are formed in each of the picture elements.

7. The color liquid crystal display device of claim 1, wherein the picture elements only has the perforated holes formed thereon such that said picture elements are substantially free of obstructions to light passing therethrough.

8. The color liquid crystal display device of claim 1, wherein said back strips have a width of 1-50 μm.

9. The color liquid crystal display device of claim 8, wherein said black strips are formed from a material selected from the group consisting of graphite, black pigment, and carbon black.

10. The color liquid crystal display device of claim 9, wherein said picture elements are disposed in an arrangement selected from stripe, mosaic, triangular, and square arrangements.

11. The color liquid crystal display device of claim 10, wherein said color filter is disposed on a first substrate, a first transparent electrode is disposed on said color filter, a second transparent electrode is disposed on said second substrate, a first orientation film is disposed on said first transparent electrode, and a second orientation film is disposed on said second transparent electrode.

12. The color liquid crystal display device of claim 11, wherein first and second polarizing plates are formed outside said first and second substrates, respectively, and a lamp is disposed adjacent to said second polarizing plate for emitting light into said display device.

13. The color liquid crystal display device of claim 1, wherein said color filter is disposed on a first substrate, a first transparent electrode is disposed on said color filter, a second transparent electrode is disposed on said second substrate, a first orientation film is disposed on said first transparent electrode, and a second orientation film is disposed on said second transparent electrode.

14. The color liquid crystal display device of claim 13, wherein first and second polarizing plates are formed outside said first and second substrates, respectively, and a lamp is disposed adjacent to said second polarizing plate for emitting light into said display device.

15. The color liquid crystal display device of claim 14, wherein the picture element only has the perforated holes formed thereon such that said picture elements are substantially free of obstructions to light from the lamp passing therethough.

* * * * *